(12) United States Patent
Chen et al.

(10) Patent No.: US 8,607,201 B2
(45) Date of Patent: Dec. 10, 2013

(54) AUGMENTING VISUALIZATION OF A CALL STACK

(75) Inventors: Qin Yue Chen, Shanghai (CN); Hong Chang Lin, Shanghai (CN); Hua Pin Shen, Shanghai (CN); Jian Qiao Sun, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 12/954,987

(22) Filed: Nov. 29, 2010

(65) Prior Publication Data

US 2011/0131552 A1    Jun. 2, 2011

(30) Foreign Application Priority Data

Nov. 30, 2009  (CN) .......................... 2009 1 0225835

(51) Int. Cl.
   *G06F 9/44*    (2006.01)

(52) U.S. Cl.
   USPC .......................................................... 717/125

(58) Field of Classification Search
   USPC .......................................................... 717/125
   See application file for complete search history.

(56) References Cited

U.S. PATENT DOCUMENTS

| | | | | |
|---|---|---|---|---|
| 6,226,787 | B1 * | 5/2001 | Serra et al. ..................... | 717/125 |
| 6,507,805 | B1 * | 1/2003 | Gordon et al. ................ | 702/186 |
| 7,310,822 | B2 * | 12/2007 | LaMacchia et al. ............ | 726/27 |
| 7,840,849 | B2 * | 11/2010 | O'Callahan .................... | 714/45 |
| 7,895,579 | B2 * | 2/2011 | Guerrera et al. ............... | 717/125 |
| 2002/0156611 | A1 * | 10/2002 | Lenormand ...................... | 703/22 |
| 2005/0086648 | A1 * | 4/2005 | Andrews et al. ............... | 717/135 |
| 2006/0101413 | A1 * | 5/2006 | Kinno et al. .................... | 717/127 |
| 2008/0178155 | A1 * | 7/2008 | Gogh et al. ..................... | 717/125 |
| 2008/0270990 | A1 * | 10/2008 | Kornstaedt ..................... | 717/126 |
| 2010/0235815 | A1 * | 9/2010 | Maybee et al. ................ | 717/125 |
| 2010/0318852 | A1 * | 12/2010 | Zheng et al. .................... | 714/37 |
| 2011/0107307 | A1 * | 5/2011 | Liu et al. ........................ | 717/125 |

OTHER PUBLICATIONS

Jerding, D. F., "Visualizing Patterns in the Execution of Object-Oriented Programs", Doctoral Consortium, CHI 96, Apr. 13-18, 1996, pp. 47-48.
Orso, A. et al., "Gammatella: Visualization of Program-Execution Data for Deployed Software", Proceedings of the 26th International Conference on Software Engineering, IEEE, 2004, pp. 1-2.
Reiss, S. "Visually Monitoring Program Execution (Extended Abstract)", Dept. of Computer Science, Brown University, Aug. 15, 1991, pp. 1-8.

* cited by examiner

*Primary Examiner* — Don Wong
*Assistant Examiner* — Theodore Hebert
(74) *Attorney, Agent, or Firm* — Law Office of Jim Boice

(57) ABSTRACT

In one embodiment, a method comprises the steps of obtaining software architecture information for describing software architecture of the software; parsing the software architecture information to generate a set of module objects, wherein the module objects correspond to software modules of the software; obtaining a call object of the software call stack, wherein the call object corresponds to a method or function executed when the software is running; comparing an invocation interface of the module object with the call object; and associating corresponding information of the module object with the call object of the software call stack according to a comparison result.

20 Claims, 12 Drawing Sheets

⊞ ✧ Local xxxxx xxxxxx xxxxxx xx xxxxx xxxxxxxx xxxxx
⊞ ✧ Local xxxxx xxxxxx xxxxxx xx xxxxx xxxxxxxx xxxxx
⊞ ✧ Local xxxxx xxxxxx xxxxxx xx xxxxx xxxxxxxx xxxxx
⊞ ✧ Non-deferrable xxxxx xxxxxx xxxxxx xx xxxxx xxxxxx
⊞ ✧ Non-deferrable xxxxx xxxxxx xxxxxx xx xxxxx xxxxxx
⊞ ✧ Non-deferrable xxxxx xxxxxx xxxxxx xx xxxxx xxxxxx
⊞ ✧ P=141920= xxxxx xxxxxx xxxxxx xx xxxxx xxxxxx
⊞ ✧ P=141920= xxxxx xxxxxx xxxxxx xx xxxxx xxxxxx
⊞ ✧ P=141920= xxxxx xxxxxx xxxxxx xx xxxxx xxxxxx
⊞ ✧ Timer-2 xxxxx xxxxxx xxxxxx xx xxxxx xxxxxx
⊞ ✧ Timer-3 xxxxx xxxxxx xxxxxx xx xxxxx xxxxxx
⊞ ✧ Web Container xxxxx xxxxxx xxxxxx xx xxxxx xxxxxx
    ⊟ ● I:com/ xxxxx xxxxxx xxxxxx xx xxxxx xxxxxxxx xxxxx
        ⊞ ● J:com/ xxxxx xxxxxx xxxxxx xx xxxxx xxxxxxxx xxxxx xxxxx xxxxxx xxxxxx xx xxxxx xxxxxxxx xxx
        ⊞ ● J:com/ xxxxx xxxxxx xxxxxx xx xxxxx xxxxxxxx xxxxx xxxxx xxxxxx xxxxxx xx xxxxx xxxxxxxx xxx
        ⊟ ● I:com/ xxxxx xxxxxx xxxxxx xx xxxxx xxxxxxxx xxxxx xxxxx xxxxxx xxxxxx xx xxxxx xxxxxxxx xxx
            ⊟ ● I:com/ xxxxx xxxxxx xxxxxx xx xxxxx xxxxxxxx xxxxx
                ● J:com/ xxxxx xxxxxx xxxxxx xx xxxxx xxxxxxxx xxxxx xxxxx xxxxxx xxxxxx xx xxxxx xxxxxx
              ⊟ ● I:com/ xxxxx xxxxxx xxxxxx xx xxxxx xxxxxxxx xxxxx xxxxx xxxxxx xxxxxx xx xxxxx xxxxxx
                ● J:com/ xxxxx xxxxxx xxxxxx xx xxxxx xxxxxxxx xxxxx xxxxx xxxxxx xxxxxx xx xxxxx
                ● I:com/ xxxxx xxxxxx xxxxxx xx xxxxx xxxxxxxx xxxxx xxxxx xxxxxx xxxxxx xx xxxx
                ● I:com/ xxxxx xxxxxx xxxxxx xx xxxxx xxxxxxxx xxxxx xxxxx xxxxxx xxxxxx xx xxxxx
                ● I:com/ xxxxx xxxxxx xxxxxx xx xxxxx xxxxxxxx xxxxx xxxxx xxxxxx xxxxxx xx xxxx
                ● I:com/ xxxxx xxxxxx xxxxxx xx xxxxx xxxxxxxx xxxxx xxxxx xxxxxx xxxxxx xx xxxxx
                ● I:com/ xxxxx xxxxxx xxxxxx xx xxxxx xxxxxxxx xxxxx xxxxx xxxxxx xxxxxx xx xxxx
            ⊞ ● I:com/ xxxxx xxxxxx xxxxxx xx xxxxx xxxxxxxx xxxxx xxxxx xxxxxx xxxxxx xx xxxxx
            ⊟ ● I:com/ xxxxx xxxxxx xxxxxx xx xxxxx xxxxxxxx xxxxx xxxxx xxxxxx xxxxxx xx xxxxx
                ● J:com/ xxxxx xxxxxx xxxxxx xx xxxxx xxxxxxxx xxxxx xxxxx xxxxxx xxxxxx xx xxxxx
                ● I:com/ xxxxx xxxxxx xxxxxx xx xxxxx xxxxxxxx xxxxx xxxxx xxxxxx xxxxxx xx xxxx
                ● I:com/ xxxxx xxxxxx xxxxxx xx xxxxx xxxxxxxx xxxxx xxxxx xxxxxx xxxxxx xx xxxxx
                ● I:com/ xxxxx xxxxxx xxxxxx xx xxxxx xxxxxxxx xxxxx xxxxx xxxxxx xxxxxx xx xxxx
                ● I:com/ xxxxx xxxxxx xxxxxx xx xxxxx xxxxxxxx xxxxx xxxxx xxxxxx xxxxxx xx xxxxx
                ● I:com/ xxxxx xxxxxx xxxxxx xx xxxxx xxxxxxxx xxxxx xxxxx xxxxxx xxxxxx xx xxxx
            ⊞ ● I:com/ xxxxx xxxxxx xxxxxx xx xxxxx xxxxxxxx xxxxx xxxxx xxxxxx xxxxxx xx xxxxx
            ⊟ ● I:com/ xxxxx xxxxxx xxxxxx xx xxxxx xxxxxxxx xxxxx xxxxx xxxxxx xxxxxx xx xxxxx
                ● J:com/ xxxxx xxxxxx xxxxxx xx xxxxx xxxxxxxx xxxxx xxxxx xxxxxx xxxxxx xx xxxxx
                ● I:com/ xxxxx xxxxxx xxxxxx xx xxxxx xxxxxxxx xxxxx xxxxx xxxxxx xxxxxx xx xxxx
                ● I:com/ xxxxx xxxxxx xxxxxx xx xxxxx xxxxxxxx xxxxx xxxxx xxxxxx xxxxxx xx xxxxx
                ● I:com/ xxxxx xxxxxx xxxxxx xx xxxxx xxxxxxxx xxxxx xxxxx xxxxxx xxxxxx xx xxxx
                ● I:com/ xxxxx xxxxxx xxxxxx xx xxxxx xxxxxxxx xxxxx xxxxx xxxxxx xxxxxx xx xxxxx
                ● I:com/ xxxxx xxxxxx xxxxxx xx xxxxx xxxxxxxx xxxxx xxxxx xxxxxx xxxxxx xx xxxx

Categories

Apache Tomcat, Eclipse Platform,
Lotus Connection
WebSphere Portal, WAS 6.1,
Lotus Sametime, Lotus Notes,
Lotus Symphony, IBM Mashup Center Lotus QuickR

FIG. 12

AUGMENTING VISUALIZATION OF A CALL STACK

CROSS-REFERENCE TO RELATED APPLICATIONS

Pursuant to 35 U.S.C. 119, Applicant claims a right of priority to Patent Application No. 200910225835.6 filed 30 Nov. 2009 in China (CN).

BACKGROUND

The invention relates generally to computers and other data processing systems and software and, more specifically, to a method, apparatus and computer program product for augmenting visualization of a software call stack.

Information visualization technology is a technology that converts data into graphics or images to be displayed on a screen and performs an interactive processing by using computer graphics and image processing techniques. Generally, developers have tooling support to visualize required information on a graphical user interface (GUI).

Analyzing software call stacks is a common and useful practice in software performance analysis. Here, the "software call stack" refers to a record of behavior of software during execution of the software. Developers usually browse and analyze software call stacks by means of the GUI that is capable of visualizing the software call stacks. The input of the software call stack visualization comes from the output of a system profiling tool. The profiling technique is developed for providing relevant information of programs upon practical execution. The profiling tool captures information of invocations (such as whether specific methods/functions are called, the number of times the specific methods/functions have been called, the relations between callers and callees, time cost in execution of the specific methods/functions, etc.) while the software is running and generates a data file as plain text output, such as a text file or a binary file. The profiling tool can assist users in analyzing and finding a bottleneck of software program execution and locating what is time-consuming, thereby ultimately realizing program optimization. However, the output of the profiling tool mainly keeps down the behavior of software programs in code level; for example, how many working threads there are, the detailed data flow and control flow (such as information of invocations), etc.

In the preexisting technique, there exists a tool that parses a data file of a software call stack outputted from the profiling tool, and recovers the software call stack to generate software call stack visualization. "Parsing" is used to generate a set of call objects based on the data file of the software call stack, and here one "call object" in the software call stack refers to one method or function executed while the software is running. "Recovering" is used to identify calling relations between all the call objects in code level.

FIG. 1 shows a screen snapshot of a portion of a software call stack visualization obtained by using an existing software call stack visualization tool. However, the existing software call stack visualization tool has the following drawbacks. First, it is quite time-consuming to browse and locate a software call stack in the existing software call stack visualization. A software call stack has multifarious and disorderly information, and a huge amount of data. In the software call stack, there may be thousands of levels to be penetrated from a starting point of an application to a specific invocation. If the reached invocation is not an interesting invocation, the users need to restart from another branch and penetrate. Such repetition is performed again and again, until locating performance issues. This even may cause the users to browse a call stack in tens to hundreds of thousands of levels or even more.

Second, all information about the software is stacked in code level. The software call stack relates only to the software's behavior in code level. It cannot depict information about the software's design and the software's architecture at a high level, although such information may be of great help in analyzing software's performance.

Usually, the software is designed in an architectural way in the art. A software architect usually designs the software as a combination of a set of modules. These modules and interactions between these modules are usually defined as the software's architecture. Information about these modules and the interactions between these modules is usually defined as software architecture information. The software's architecture is completed in a software design stage and can be obtained by relevant personnel.

FIG. 2 shows an exemplary block diagram of the software architecture of existing software, wherein one block represents one module and an overlap between different modules represents that the modules have a calling relationship. Normally, it is possible to complete all module definitions in the software design stage. For example, a module may be defined as a code unit executing functionality. When the software is running, modules of the software collaborate together to fulfill a function or service as a whole. If the software has performance issues, most likely there is a bottleneck in some modules. So in many cases, a performance analyst only cares about a portion of the software call stack, and the portion can be mapped to one or more modules in the software's architecture.

Some attempts have been made in the prior art to solve the aforementioned problems in the existing software call stack visualization tool. First, using a key word or expression-based search, which provides a function of searching for a call stack based on a keyword. Second, grouping and filtering by predefining metrics or thresholds, which provides a filtering function based on a regular expression or thresholds. One of the examples using such a search technique is IBM® Visual Performance Analyzer (VPA) (its detailed description can be consulted from the website http://www.alphaworks.ibm-.com/tech/vpa). FIG. 3 shows a screen snapshot of an inquiry interface provided using an IBM® VPA visualization window.

These means are useful, but achieve limited functions. These means only deal with the software call stack itself, and all the information of the software is still stacked in code level. These means do not allow the users to apply knowledge of the software's architecture in browsing and locating the software call stack. Accordingly, there is a need for a method that is able to argument visualization of a software call stack, so that users can apply their knowledge of the software product's architecture while visualizing and analyzing the software call stack, thereby assisting in searching for and locating execution information of an interesting module.

SUMMARY

The invention provides a method, apparatus and system for augmenting visualization of a software call stack. The software call stack visualization, according to one embodiment of the invention, is combined with software architecture information. The software call stack visualization realized according to this embodiment can assist users in applying their knowledge to a software product's architecture, thereby accelerating browsing the software call stack and helping to locate performance bottlenecks.

The invention can be carried out in a plurality of ways including methods, and various apparatus and systems. Several embodiments of the invention are discussed below.

As a method for augmenting visualization of a software call stack of a software, an embodiment of the invention comprises at least the following operations: obtaining software architecture information for describing software architecture of the software; parsing the software architecture information to generate a set of module objects, wherein the module objects correspond to software modules of the software; obtaining a call object of the software call stack, wherein the call object corresponds to a method or function executed when the software is running; comparing an invocation interface of the module object with the call object; and associating corresponding information of the module object with the call object of the software call stack according to a comparison result.

As an apparatus for augmenting visualization of a software call stack of a software, an embodiment of the invention comprises at least the following: means for obtaining software architecture information for describing software architecture of the software; means for parsing the software architecture information to generate a set of module objects, wherein the module objects correspond to software modules of the software; means for obtaining a call object of the software call stack, wherein the call object corresponds to a method or function executed when the software is running; means for comparing an invocation interface of the module object with the call object; and means for associating corresponding information of the module object with the call object of the software call stack according to a comparison result. As a system for augmenting visualization of a software call stack of software, an embodiment of the invention comprises at least the apparatus described above.

BRIEF DESCRIPTION OF THE SEVERAL VIEWS OF THE DRAWINGS

FIG. 1 is a screen snapshot of a portion of a software call stack visualization obtained by using an existing software call stack visualization tool;

Figure 3:
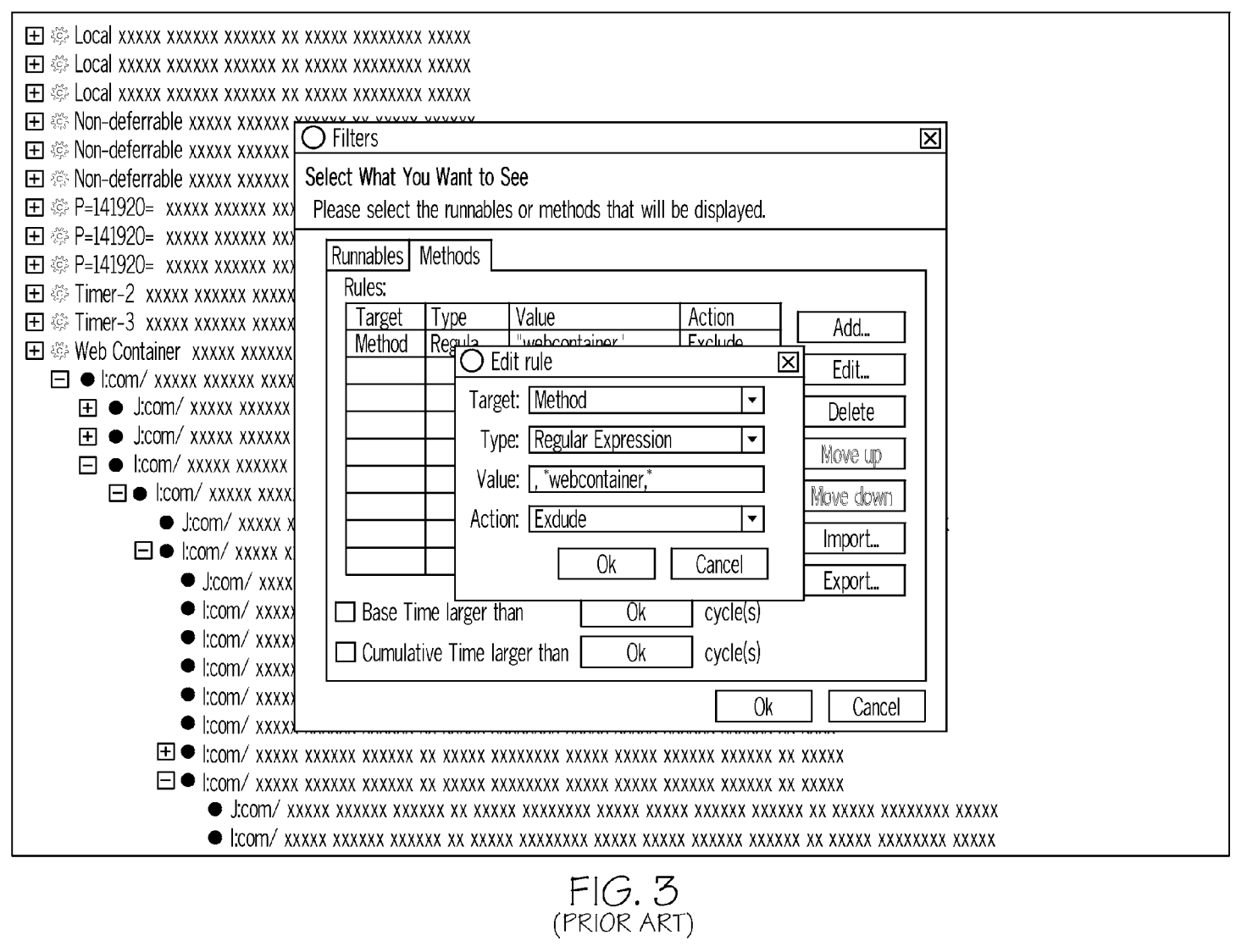

FIG. 3 shows a screen snapshot of an inquiry interface provided using an IBM® VPA visualization window;

FIG. 9 shows a screen snapshot of an inquiry interface provided using a software call stack visualization window according to one embodiment of the invention;

FIG. 12 shows an exemplary tag generated using attributes of a description file according to an embodiment of the invention.

DETAILED DESCRIPTION

Figure 2:
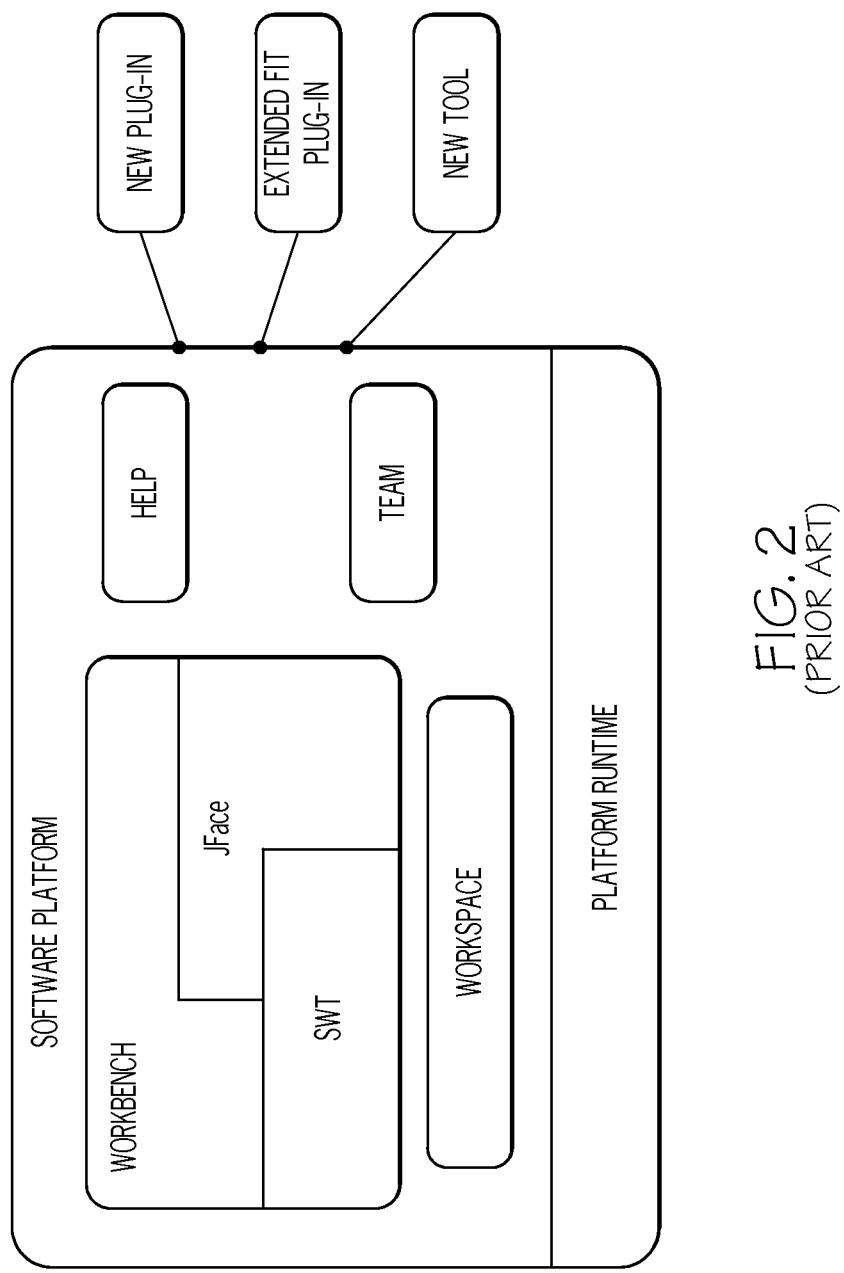
FIG. 2 is an exemplary block diagram showing software architecture of existing software.

The present invention will now be described in terms of specific, exemplary embodiments. It is to be understood that the invention is not limited to the exemplary embodiments disclosed. It should also be understood that not every feature of the presently disclosed method, apparatus and system for augmenting visualization of a software call stack is necessary to implement the invention as claimed in any particular one of the appended claims. Various elements and features of apparatus are described to fully enable the invention. It should also be understood that throughout this disclosure, where a process or method is shown or described, the steps of the method may be performed in any order or simultaneously, unless it is clear from the context that one step depends on another being performed first.

One embodiment of the invention obtains software architecture information; parses the software architecture information to generate a set of module objects, wherein the module objects correspond to software modules of the software; obtains a call object of the software call stack, wherein the call object corresponds to a method or function executed when the software is running; compares an invocation interface of the module object with the call object; and associates corresponding information of the module object with the call object of the software call stack according to a comparison result.

In an alternative embodiment, the invention may also first generate visualization of a software call stack as the prior art does, and then associate software architecture information with the visualization of the software call stack according to user input, which requests for filling as described above.

In one embodiment, the invention provides a format for performing a formatting description of software architecture. In another embodiment, a call object of a software call stack is obtained from the visualization of the software call stack. In another embodiment, the filling is realized by writing attributes of the currently matching module object into another address within a memory and establishing a link from the matched call object to the another address, or writing the attributes into an address adjacent to the call object, such as writing the attributes into an even address or an odd address adjacent to a storage address of the corresponding call object, or by using the attributes as one of parameters of the corresponding call object, or by associating the attributes of the module object with the corresponding call object in any way. In a further embodiment, attributes of a module object comprise a name of a module, an invocation interface of the module, and a previous module of the module (i.e., another module that calls the module). In a further embodiment, a description file also has attributes that comprise version and author of the description file, and version, name and the like of the described software, etc. By providing the attributes described above, the invention may build a descriptive repository to store and share description files for different software architectures.

Figure 4:
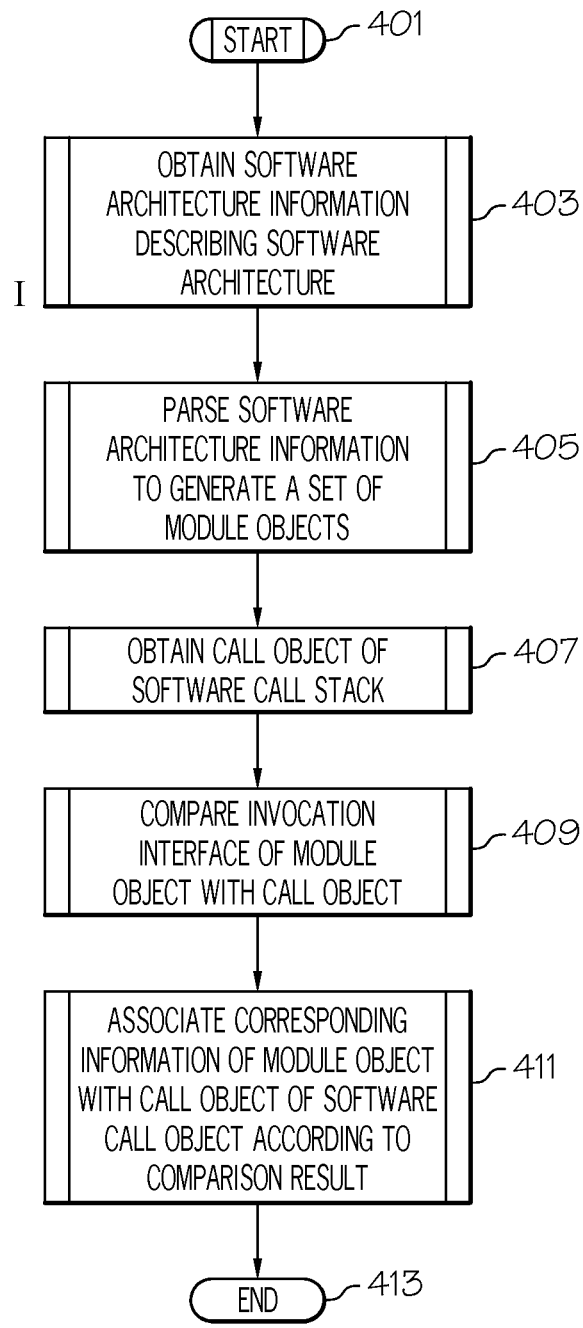
FIG. 4 is a flow diagram showing a method for augmenting visualization of a software call stack according to one embodiment of the invention.

FIG. 4 is a flow diagram showing a method for augmenting visualization of a software call stack according to one embodiment of the invention. The process starts at step 401.

At step 403, architecture information for the software is obtained. As described above, the software architecture has already been determined in the software design stage, and relevant technicians may obtain the software architecture information from the software design. In an embodiment of the invention, the software architecture information is in the form of a description file that structurally describes the software architecture in a predetermined format.

At step 405, the software architecture information is parsed to generate a set of module objects of the software. The module objects correspond to software modules, usually on a one-to-one basis. A module object is shown below as an example. In this exemplary implementation mode, the module object is a plurality of sets of data stored in a memory that were generated by parsing the software architecture information. In this implementation mode, a module object is a set of data including a name of a module, a previous module of the module, and an invocation interface of the module.

| | |
|---|---|
| 0x0001 | WWW Security |
| 0x0003 | Dogear Access |
| 0x0005 | I:com/ibm/ws/security/web/FormLoginExtensionProcessor.-handleRequest(ServletRequest, ServletResponse) void |

In another implementation mode, software architecture information is parsed as class objects in a plurality of software programs, and each class object is directed to an initial address that stores a set of information, such as 0x0001. Of course, those skilled in the art may further envisage other implementation modes, so long as information of each software module can be found, and all these implementation modes fall within the scope of the invention.

At step 407, a call object of the software call stack is obtained. A call object of the software call stack is shown below as an example. As described above, a call object in the call stack refers to a method or function executed when a software is running:

Void        FormLoginExtensionProcessor.handleRequest (ServletRequest, ServletResponse)

This method is an interface invocation method for a security control module in a web container. The invocation interface has two parameters, i.e., ServletRequest and ServletResponse. After the invocation interface is called by a program, it enters the security control module to specifically execute a function of the security control module and writes an execution result into the parameter ServletResponse.

At step 409, the invocation interface of the module object is compared with the call object. At step 411, corresponding information of the module object is associated with the call object of the software call stack in accordance with a comparison result. The process ends at step 413.

An embodiment of the invention provides a format for structurally describing software architecture based on the following assumption: the software architecture can be illustrated as a set of modules. The format for describing the software architecture is defined to be universal and platform-irrelevant, and this means that the format can be applied to different types of software, even though the software is architecturally constructed with different technologies. According to the format, the description of the software architecture can be defined and reused by different persons including software architects, developers and performance analysts.

The format according to one embodiment of the invention is designed to include the relationships between modules of the software, for describing the calling relationships between these modules when these modules collaborate together. In a preferred embodiment, the format only describes the relationship of a module being called by another module, namely, only describes a previous module that directly calls the module. This format conforms to an execution sequence of software code and is readily realized by users. In another embodiment, the format can describe the relationship of a module calling another module, namely, only describes a succeeding module that the module directly calls. In a further embodiment, the format may also include redundant invocation relationship information. That is to say, besides describing the relationship of a module (as the callee) being called by another module, the format further describes the relationship of the module (as the caller) calling another module.

Furthermore, the format is further designed to include features of each module. Each module has some features such as a name of the module, and an invocation interface for invocation, etc. For a module, the format describes the features of the module by means of the name of the module, and the invocation interface through which the functions of the module can be called.

In this text, the calling relationships between the modules, the features of the modules and the like are called attributes of the modules. The format defines the modules using respective attributes of the modules.

For software architecture that can be represented as a set of modules, the format for structurally describing the software architecture according to one embodiment of the invention is represented as below:

Arch→ArchModules→ArchModule→Entries→Entry

The format first defines the software architecture, then defines one or more modules included in the architecture, and then defines each of the one or more modules, further defines one or more invocation interface included in each module, and finally defines each of the one or more invocation interfaces.

A file describing the format according to one embodiment of the invention, which is compiled using XML language, is shown below:

```
<?xml version="1.0" encoding="UTF-8"?>
<xs:schema xmlns:xs="http://www.w3.org/2001/XMLSchema"
 elementFormDefault="qualified">
  <xs:element name="Arch">
   <xs:complexType>
    <xs:sequence>
     <xs:element maxOccurs="1" minOccurs="0"
ref="ModuleList" use="required"/>
    </xs:sequence>
     <xs:attribute name="version" type="xs:string"
      use="required"/>
    <xs:attribute name="author" type="xs:string" use="required"/>
     <xs:attribute name="software" type="xs:string"
      use="required"/>
    <xs:attribute name="software-version" type="xs:string"
      use="required"/>
   </xs:complexType>
  </xs:element>
  <xs:element name="ModuleList">
   <xs:complexType>
    <xs:sequence>
     <xs:element maxOccurs="unbounded" minOccurs="1"
      ref="Module"/>
    </xs:sequence>
   </xs:complexType>
  </xs:element>
  <xs:element name="Module">
   <xs:complexType>
    <xs:sequence>
```

```
        <xs:element minOccurs="1" ref="Entries"/>
      </xs:sequence>
    </xs:complexType>
      <xs:attribute name="name" type="xs:string"
        use="required"/>
      <xs:attribute name="prev" type="xs:string" use="requried"/>
  </xs:element>
  <xs:element name="Entries">
    <xs:complexType>
      <xs:sequence>
        <xs:element maxOccurs="unbounded" minOccurs="1"
          ref="Entry"/>
      </xs:sequence>
    </xs:complexType>
  </xs:element>
  <xs:element name="Entry">
    <xs:complexType>
      <xs:attribute name="name" type="xs:string" use="required"/>
    </xs:complexType>
  </xs:element>
</xs:schema>
```

In the above file, the $1^{st}$ line is a declaration statement beginning of XML, before which there cannot be characters in any form, wherein Version represents a version number of XML; encoding represents an encoding manner of a document, which is "UTF-8" in default. The declaration "http://www.w3.org/2001/XMLSchema" on the $2^{nd}$ line is an XML file format description. The first two lines are declaration statements required for the XML file.

The $3^{rd}$ to $13^{th}$ lines define element "Arch", which appears at least once, refers to Modulelist, and has the following 4 attributes: version, author, software, and software version, all these attributes being represented using strings. The $14^{th}$ to $20^{th}$ lines define element "Modulelist", which appears undefined times at most but once at least, and refers to Module.

The $21^{st}$ to $29^{th}$ lines define element "Module", which appears undefined times at most but zero time at least, refers to Entries, and has the following two attributes: name, and previous module, both attributes being represented using strings.

The $30^{th}$ to $36^{th}$ lines define element "Entries", which appear undefined times at most but once at least, and refers to Entry. The $37^{th}$ to $41^{st}$ lines define element "Entry", which has the following one attribute: name, this attribute being represented using a string.

Figure 5:
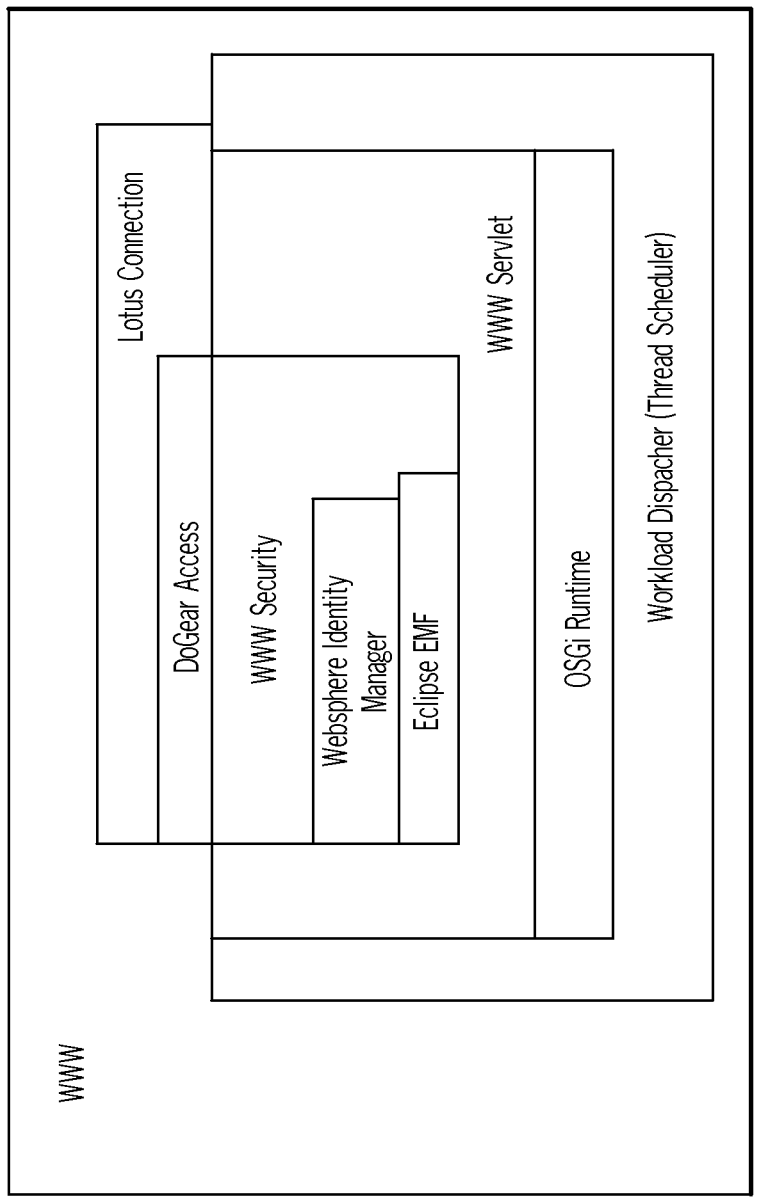
FIG. 5 is a schematic module structure view showing architecture of a software application as one example.

FIG. 5 is a schematic module structure view showing exemplary software architecture. Software architecture, which is called "WWW" here in this example, a description file for structurally describing the software architecture in the format according to one embodiment of the invention is shown. The software architecture "WWW" is composed of a series of modules, as shown in FIG. 5. The description file of its software architecture, which is compiled using XML in the format according to the invention is shown below:

```
<?xml version="1.0" encoding="UTF-8" ?>
<Arch version="0.1" author="linhc" software="Lotus Connection"
software-version="7.1">
  <ModuleList>
    <Module name="Lotus Connection" prev="WWW">
      <Entries>
        <Entry
name="I:com/ibm/lconn/core/web/auth/
LCUserDataConstraintFilter.doFilter(Servlet Request, ServletResponse,
FilterChain) void" />
        <Entry
name="I:com/ibm/lconn/core/web/auth/
LCBasicAuthFilter.doFilter(ServletRequest, ServletResponse, FilterChain)
void" />
      </Entries>
    </Module>
    <Module name="WWW Servlet" prev="Lotus Connection">
      <Entries>
        <Entry
name="I:com/ibm/ws/webcontainer/
servlet/ServletWrapper.service(ServletRequest, ServletResponse) void" />
      </Entries>
    </Module>
    <Module name="Dogear Access" prev="WWW">
      <Entries>
        <Entry
name="I:com/ibm/dogear/filter/auth/
DogearAuthFilter.doFilter(ServletRequest, ServletResponse, FilterChain)
void" />
        <Entry
name="I:com/ibm/dogear/filter/
Utf8CharEncodingFilter.doFilter(ServletRequest,
ServletResponse, FilterChain) void" />
        <Entry
name="I:com/ibm/dogear/filter/auth/
DogearPrivateAccessFilter.doFilter(ServletRequest, ServletResponse,
FilterChain) void" />
        <Entry
name="I:com/ibm/dogear/filter/stats/
RequestStatisticsFilter.doFilter(ServletRequest,
ServletResponse, FilterChain) void" />
      </Entries>
    </Module>
    <Module name="WWW Security" prev="Dogear Access">
      <Entries>
        <Entry
name="I:com/ibm/ws/security/web/
FormLoginExtensionProcessor.handleRequest(ServletRequest,
ServletResponse) void" />
      </Entries>
    </Module>
  </ModuleList>
</Arch>
```

In the file, the $1^{st}$ line is a declaration statement beginning of XML. The $2^{nd}$ line defines the name of the description file as "Arch" and its author as "linhc", the name of the software described by the description file is "Lotus Connection", and the version of the software is "7.1". The $3^{rd}$ line defines a module list. The $4^{th}$ line defines that the name of the first module in the module list is "WWW Thread Pool".

The $5^{th}$ line defines an invocation interface of a module. The $6^{th}$ line defines the name of one of the invocation interfaces of a module as "I:com/ibm/ws/wswebcontainer/WebContainer. handleRequest(IRequest, IResponse) void". The $9^{th}$ line defines the name of the second module in the module list as "WWW container", and the name of its previous module is "WWW Thread Pool". In the subsequent portion of the file, the attributes of respective modules are described in a similar manner.

In another embodiment of the invention, the description file itself of the software architecture generated in the format also has some attributes, such as the version of the description file, the author of the description file, the version of the software described by the description file, and the name of the software described by the description file, etc. By using these attributes, a repository for description files of different software architectures can further be constructed. In the description file repository, some social computing techniques can be used to realize sharing and collaboration between the description files.

The preferred embodiments of the invention are described below with reference to the accompanying drawings, but the detailed description given here is not intended to limit the invention to such embodiments. Instead, the invention comprises all modifications, variations and equivalents thereof.

Figure 6:
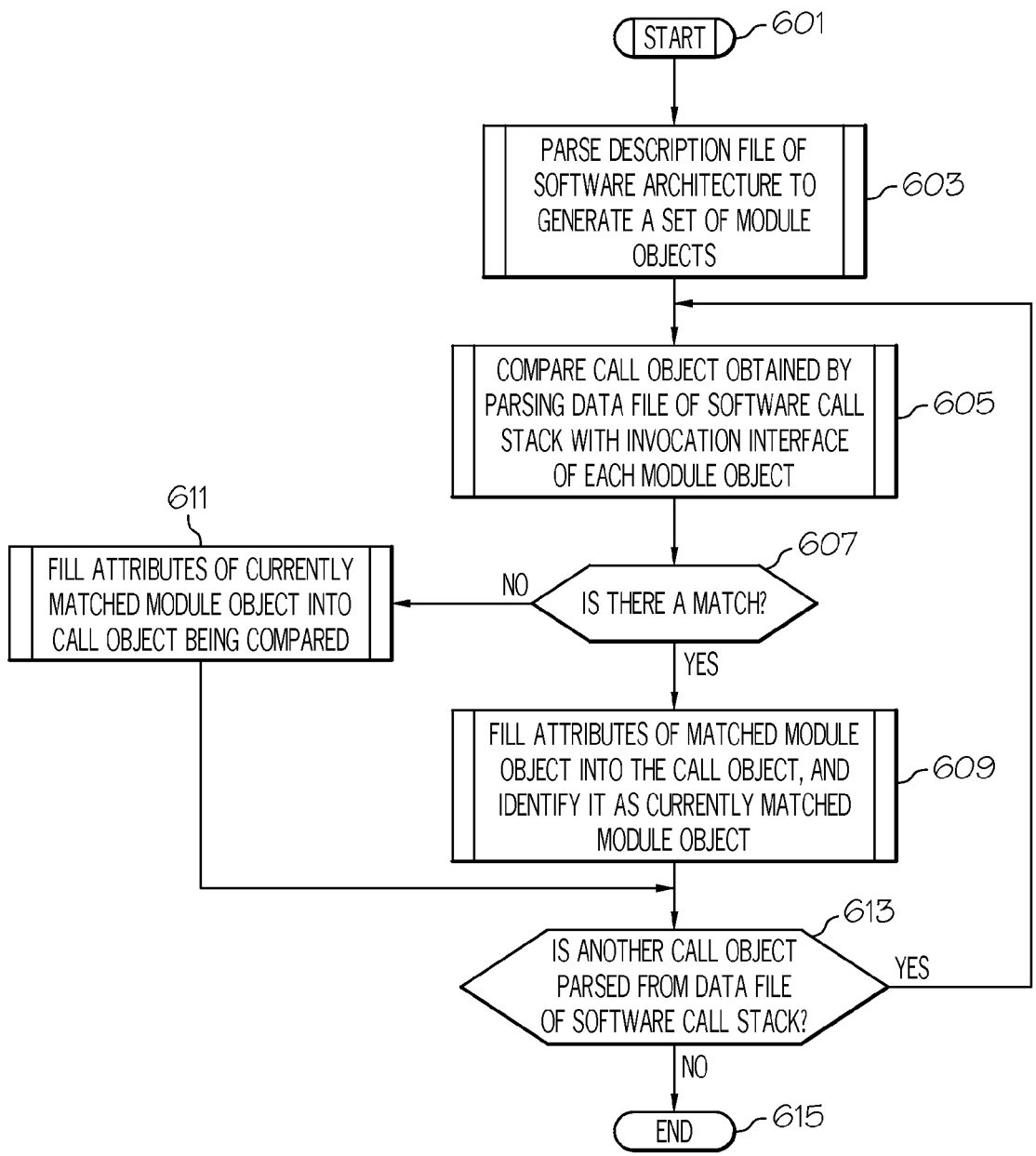
FIG. 6 is a flow diagram showing a method for augmenting visualization of a software call stack according to another embodiment of the invention.

FIG. 6 is a flow diagram showing a preferred method for augmenting visualization of a software call stack according to another embodiment of the invention. The process starts at step 601. At step 603, a description file of software architecture is parsed to generate a set of module objects. The module objects correspond to software modules. The description file structurally describes the software architecture in a format according to one embodiment of the invention. The description file may be generated in advance by a user, or obtained from other users.

At step 605, a call object obtained by parsing a data file of a software call stack is compared with an invocation interface of each of the module objects. As described above, the stack data file of the software call stack is a plain text file output from the existing profiling tool.

At step 607, a determination is made as to whether both match. If there is a match, the process proceeds to step 609. If there is no match, the process proceeds to step 611. Here, "match" means a strict match between character strings. Of course, other matching methods can be used as well, so long as it can be determined that a call object and an invocation interface of a module object indicate the same method or function.

At step 609, attributes of the matched module object are filled into the call object, and the matched module object is identified as the currently matched module object in the system. The term "fill" refers to correlating an attribute of the matched module object with the corresponding call object being compared, so that the corresponding call object can obtain the attribute of the module object to which it belongs. In one embodiment, filling is realized by writing attributes of the matched module object into another address within a memory and establishing a link from the corresponding call object to the another address. In another embodiment, an attribute of the matched module object is caused to be one of parameters of the corresponding call object. For example, a module object has attributes A, but the corresponding call object is B (C, D), and then the filling realizes B(C, D)→B(C, D, A).

In a further embodiment, the filling is writing attributes of the matched module object into an address adjacent to the corresponding call object and, for example, a storage address of the attributes of the module object and a storage address of the corresponding call object are an adjacent even address and odd address, respectively. It is also possible to use other methods that are envisaged by those skilled in the art, so long as the corresponding method/function is enabled to obtain an attribute of the module object to which it belongs.

At step 611, the attributes of the currently matched module object are filled into a call object being compared. Since the call object being compared does not match an invocation interface of each module object, it is considered that the call object is still running in a module corresponding to the currently matched module object identified in the system, so the attributes of the current module object do not change. Thus, the attributes of the currently matched module object stored in the system are filled into the call object.

At step 613, determination is made as to whether another call object is to be parsed from a data file of a software call stack. If there is another call object, the process returns to step 605. If not, the process ends at step 615.

Figure 7:
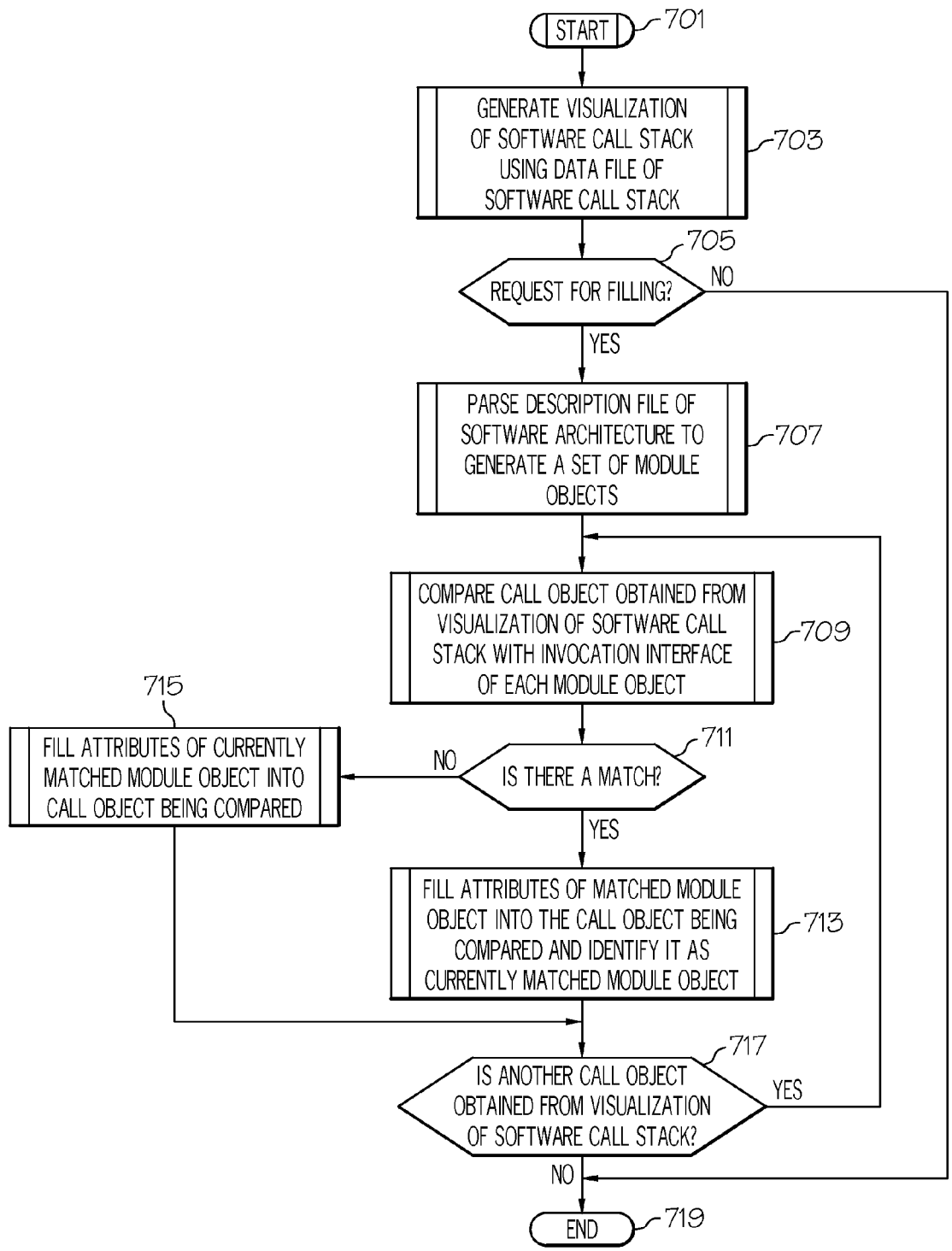
FIG. 7 is a flow diagram showing a method for augmenting visualization of a software call stack in response to user input according to another embodiment of the invention.

FIG. 7 is a flow diagram showing a preferred method for augmenting visualization of a software call stack in response to user input, according to another embodiment of the invention. The process starts at step 701. At step 703, the prior-art visualization tool for a software call stack is used, and the visualization of the software call stack is generated from a data file of the software call stack. At step 705, a determination is made as to whether or not a user request for associating software architecture information with the visualization of the software call stack is received. If it was received, the process proceeds to step 707. If not, the process proceeds to step 719.

At step 707, a description file of the software architecture is parsed to generate a set of module objects. The module objects correspond to software modules. At step 709, a call object obtained from the visualization of the software call stack is compared with an invocation interface of each of the module objects. At step 711, a determination is made as to whether both match. If there is a match, the process proceeds to step 713. If not, the process proceeds to step 715.

At step 713, attributes of the matched module object are filled into a call object being compared, and the matched module object is identified as the currently matched module object. At step 715, the attributes of the currently matched module object are filled into the call object being compared. At step 717, determination is made as to whether another call object is obtained from the visualization of the software call stack. If there is another call object, the process returns to step 709. If not, the process proceeds to step 719 where the process ends. Of course, the method according to the invention does not have to be executed in the execution order as shown. For instance, in FIG. 7, step 707 may also be executed prior to step 705 or step 703.

Figure 8:
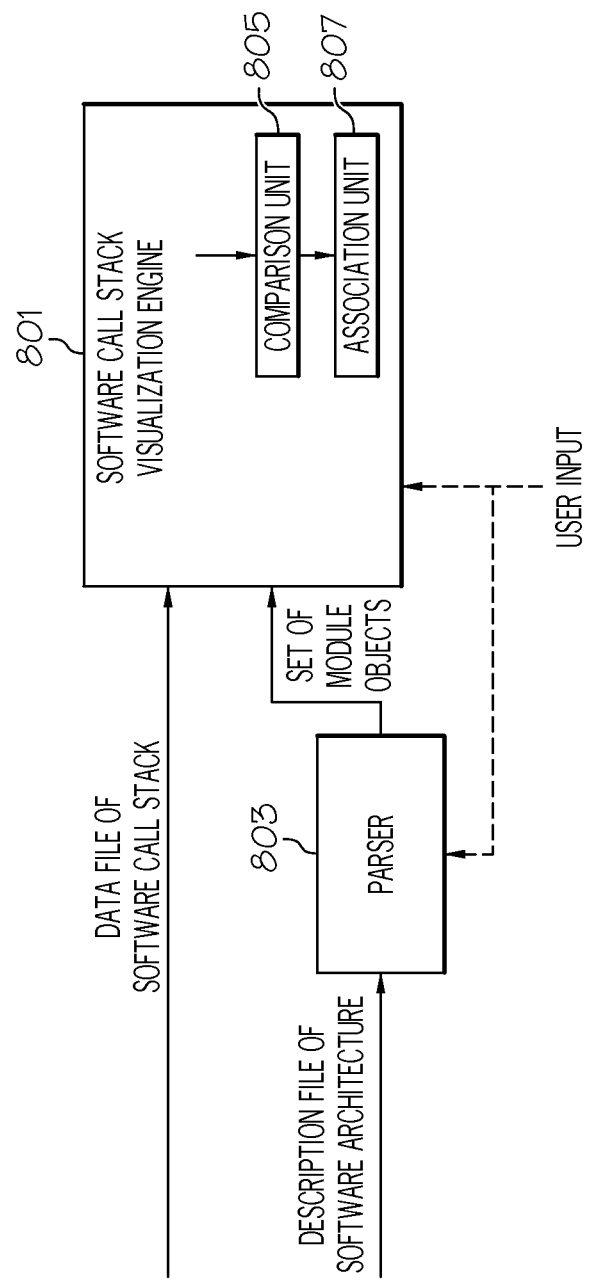
FIG. 8 is a schematic block diagram showing an apparatus for augmenting visualization of a software call stack according to one embodiment of the invention.

FIG. 8 is a schematic block diagram showing an apparatus for augmenting visualization of a software call stack according to one embodiment of the invention. The apparatus comprises a software call stack visualization engine 801 and a parser 803. The software call stack visualization engine 801 receives a data file of a software call stack output from the profiling tool as input. The software call stack visualization engine 801 has functions of the traditional software call stack visualization tool, i.e., parsing the received data file of the software call stack and recovering the software call stack to generate software call stack visualization. The software call stack visualization engine 801 further receives output from the parser 803 as another input.

The parser 803 receives software architecture information. In the embodiment, the software architecture information is in the form of a description file for the software architecture. The description file is generated using the format according to the invention. The description file can be compiled using XML, but the invention is not limited to this. The description file may also be compiled using any other language that can be parsed. The parser 803 parses the received description file into a set of module objects.

The software call stack visualization engine 801 further comprises a comparison module 805 and an association module 807. The comparison module 805 compares each call object parsed by the software call stack visualization engine 801 from the data file of the software call stack with an invocation interface of each of the module objects received from the parser 803, and notifies the association module 807 of a comparison result, i.e., whether or not there is a match. The association module 807 associates the corresponding software architecture information with the software call stack visualization in accordance with the comparison result received from the comparison module 805. If the received comparison result indicates that there is a match, the association module 807 fills attributes of the matched module object into a call object being compared, and identifies the matched module object as the currently matched module object in the system. If the received comparison result indicates that there is no match, the association module 807 fills attributes of the currently matched module object in the system into a call object being compared.

In another embodiment, the software call stack visualization engine 801 can further receive user input requesting for filling and the comparison unit 805 obtains the call object from the software call stack visualization, units comprised in the apparatus and functions of the units are the same as those in the above embodiment. If the software call stack visualization engine 801 does not receive the user input, the data file of the software call stack generates the visualization of the software call stack using the traditional software call stack visualization function without consideration of any input from the parser 803. If the software call stack visualization engine 801 receives the user input, attributes of a set of module objects from the parser 803 are filled into the corresponding call objects in the manner described with respect to the above embodiment.

In a further embodiment, the parser 803 also receives the user input. Units comprised in the apparatus and functions of the units are the same as those in the above-mentioned another embodiment. If the parser 803 does not receive the user input, the description file of the software architecture is not parsed, thereby providing no input to the software call stack visualization engine 801. If the user input is received, the description file of the software architecture is parsed into a set of module objects and they are outputted to the software call stack visualization engine 801. This can reduce the usage of system resources. The above-mentioned examples merely show a preferred mode of combining the software architecture information into the software call stack visualization, whereby those skilled in the art can envisage other implementation modes, which fall within the scope of the invention.

Figure 9:
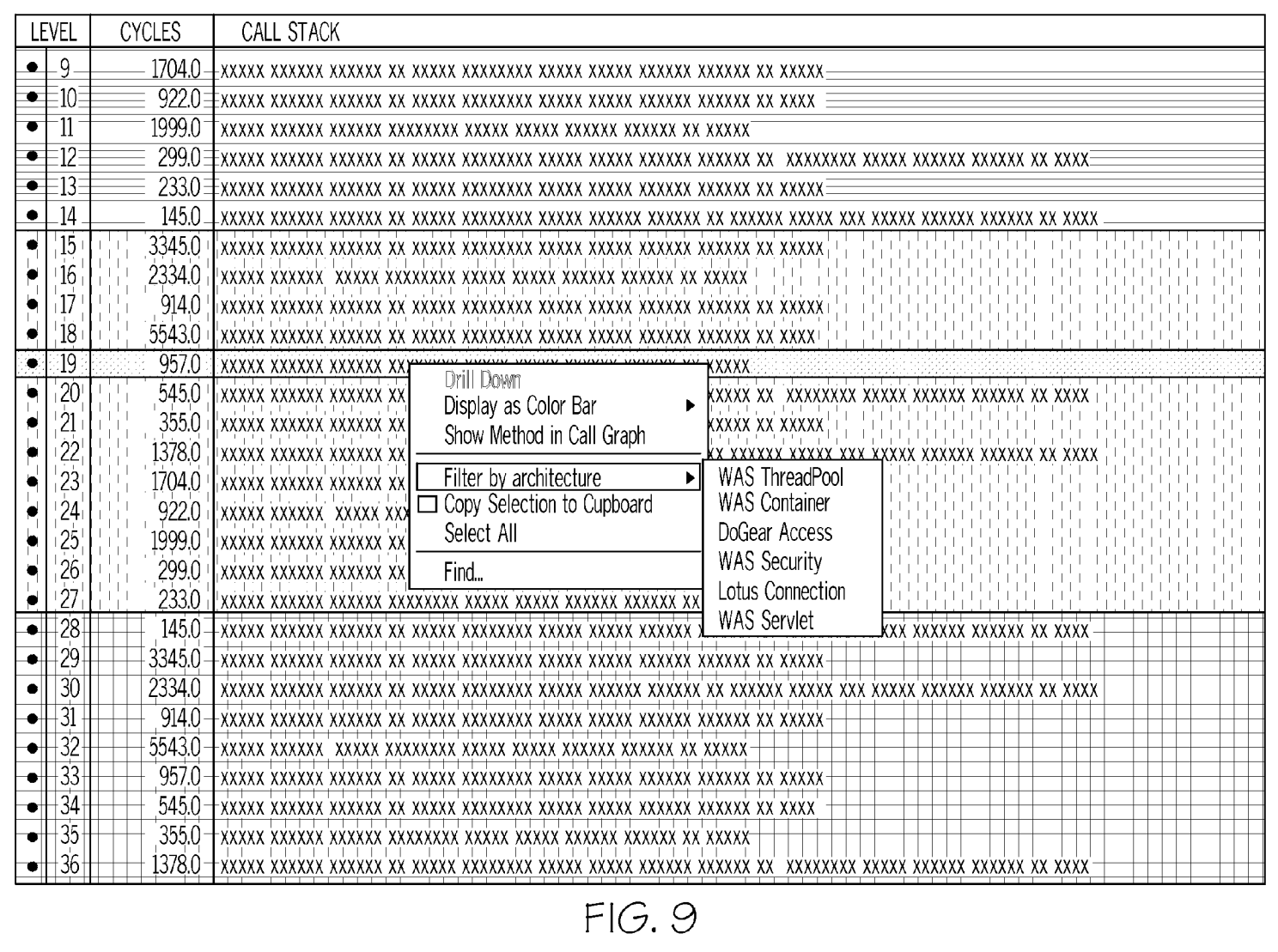

FIG. 9 shows a screen snapshot of an inquiry interface provided using a software call stack visualization window according to one embodiment of the invention. The visualization shown in FIG. 9 is further based on the software architecture shown in FIG. 5. From the screen snapshot shown in FIG. 9, it can be seen that a software call stack can be browsed, filtered or located according to software modules. In addition, it is possible to highlight call stacks of different software modules in different colors as shown in FIG. 9. Highlighting in different colors is merely exemplary, whereby those skilled in the art can envisage other modes of visually distinguishing call stacks of different modules, which fall within the scope of the claims.

Figure 10:
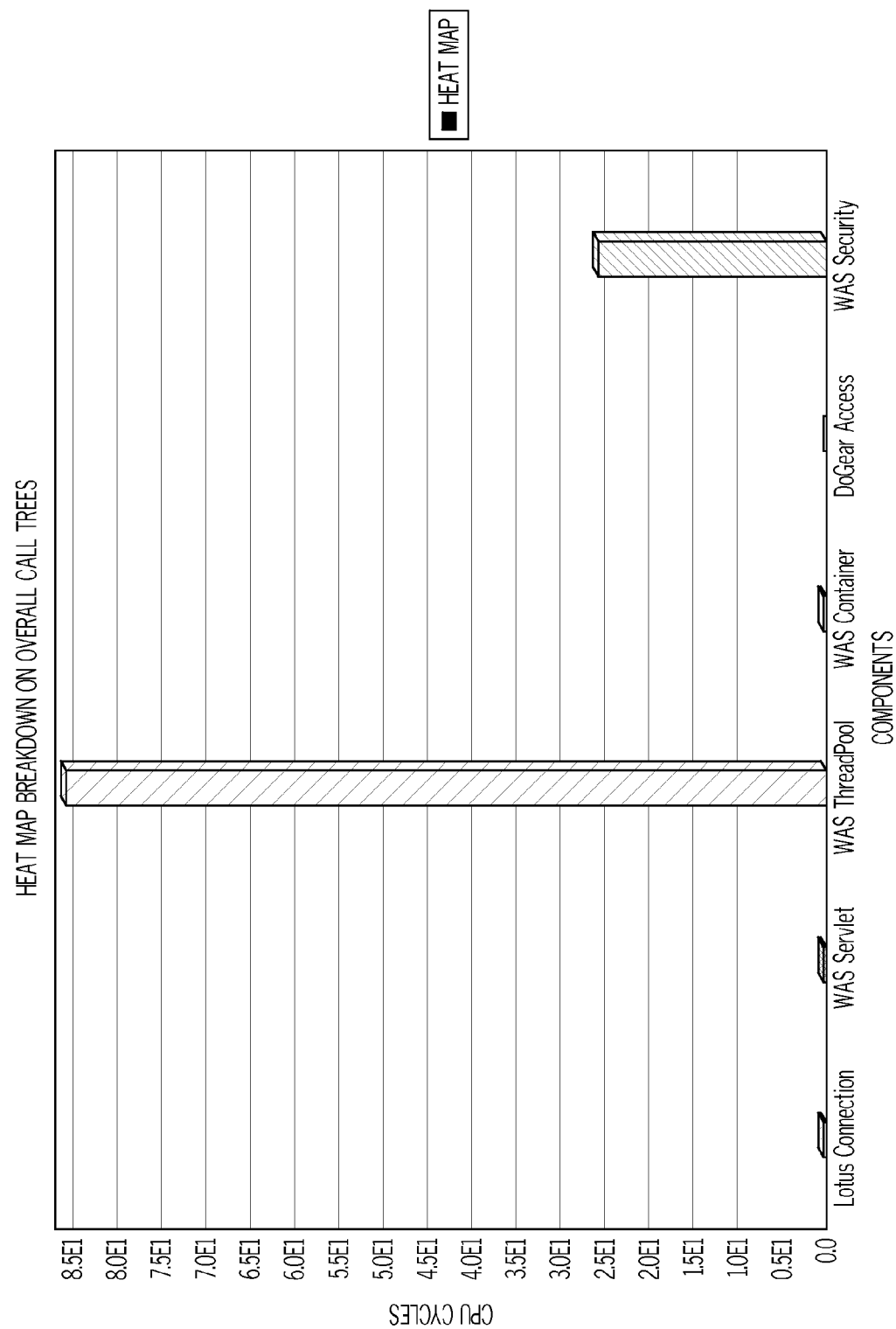
FIG. 10 is a histogram showing usage of system resources by software modules obtained by using the augmented software call stack visualization according to one embodiment of the invention.

FIG. 10 is a histogram showing usage of system resources by software modules obtained by using the augmented software call stack visualization according to the invention. When parsing and recovering each called method/function, the invention can determine which module each called method/function belongs to, and accumulates for the module, its basic CPU cycles or bytes used by each method/function therein (which is the consumption on executing the invocation entity itself), thereby forming the histogram as shown in FIG. 10.

Figure 11:
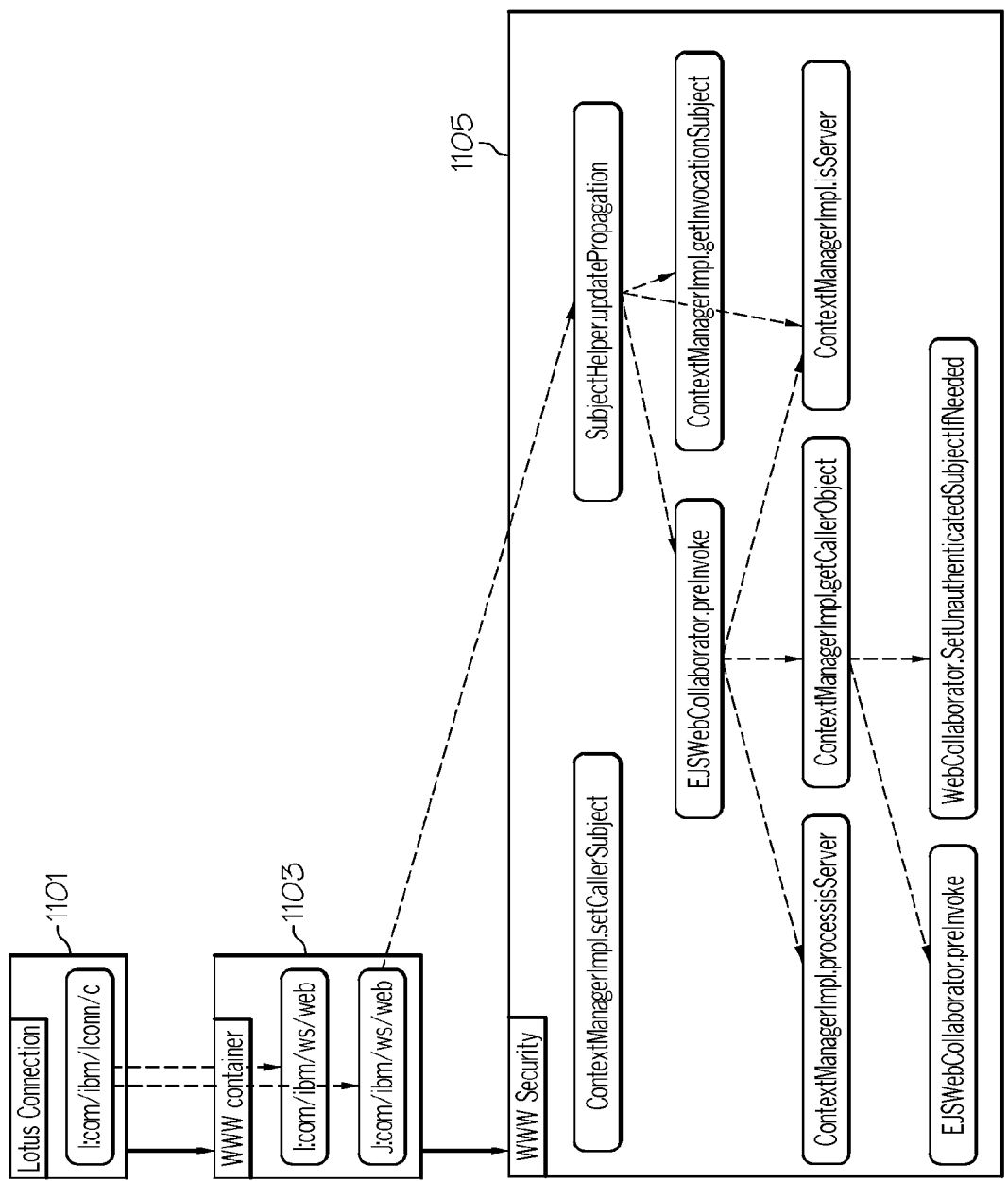
FIG. 11 is a schematic view showing the calling relationships between the software modules obtained by using the augmented software call stack visualization according to one embodiment of the invention.

FIG. 11 is a schematic view showing the calling relationships between the software modules obtained by using the augmented software call stack visualization according to the invention. In the prior art, it is only possible to generate the calling relationships between methods/functions, as shown by dotted lines in FIG. 11. However, it is unclear which software module each called method/function belongs to, and the calling relationships between software modules are unclear.

Since the software call stack visualization has knowledge of software modules, it is possible to display which called methods/functions each software module comprises and the calling relationships between software modules. In the call graph visualization as shown in FIG. 11, all the methods/functions of the same software module are grouped in a rectangular box, as represented by 1101, 1103 and 1105, which represents a software module. The invocations between the software modules are presented as solid lines, and the text on the left top corner of the rectangular box in FIG. 11 is the name of the module. Each small box in the rectangular box represents its invocation interface, and the text in the small box is the name of the invocation interface.

In addition, a description file for structurally describing software architecture is generated using the format according to the invention, and a description file repository can be built to store and share descriptions of different software architectures. The description file repository allows different roles in a software's life cycle or software development community to contribute their descriptions of the software architecture. Since different people have different knowledge, different depths of understanding of a software, a shared description file repository is possible to enable collaboration and hence provide more profound descriptions of software architecture. The description file repository is able to maintain and manage description files contributed by different people, and the description file is categorized and saved into the repository according to its attributes: author of the description file, version of the description file, name of the software described by the description file, and version of the software described by the description file. Furthermore, some attributes of the description file can be used as tags. As the description file repository is growing, the prior-art tools can be used to build tags for a description file to illustrate hotness of the description file and the trend of collaboration. This way can help and guide the contributions to the description file. FIG. 12 shows an exemplary tag generated using attributes of a description file according to an embodiment of the invention.

It should be appreciated that, the embodiments of the present invention are described above with reference to different functional means and a processor for the sake of clarity. Obviously, any suitable function distribution can be used between the different functional means and the processor, without departing from the present invention. For example, the illustrated functions executed by a separate unit or processor can be executed by the same unit or processor. Thus, only the description of the specific functional means is considered as a description of a suitable device for providing the functions, but does not represent a strict logic or physical structure or organization. Furthermore, the order of the features in the claims does not represent any specific order in which the features function and, particularly, the order of the steps in method claims does not represent that these steps must be executed in this order. Conversely, these steps can be executed in any suitable order.

The present invention is described with detailed illustrations of the embodiments of the present invention, and these embodiments are provided as examples and do not intend to limit the scope of the present invention. The embodiments described comprise different characteristics and not all these characteristics are needed in all the embodiments in the present invention. Some embodiments in the present invention merely utilize some characteristics or possible combinations of characteristics. Variations of the embodiments of the present invention as described including different combinations of the characteristics recited in the embodiments described can be envisaged by those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Aspects of the present invention may take the form of a computer program product embodied in one or more computer readable medium(s) having computer readable program code embodied thereon. Any combination of one or more computer readable medium(s) may be utilized. The computer readable medium may be a computer readable storage medium or a computer readable signal medium. A computer readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein; for example, in baseband or as part of a carrier wave. Such a propagated signal may take any of a variety of forms including, but not limited to, electro-magnetic, optical or any suitable combination thereof. A computer readable signal medium may be any computer readable medium that is not a computer readable storage medium and that can communicate, propagate or transport a program for use by or in connection with an instruction execution system, apparatus or device. Program code embodied in a computer readable signal medium may be transmitted using any appropriate medium including, but not limited to, wireless, wire line, optical fiber cable, RF, etc., or any suitable combination of the foregoing.

Computer program code for carrying out operations of the present invention may be written in any combination of one or more programming languages, including an object oriented programming language such as Java™, Smalltalk, C++ or the like, and conventional procedural programming languages, such as the "C" programming language or similar programming languages. (Java and all Java-based trademarks and logos are trademarks of Sun Microsystems, Inc., in the United States, other countries or both.) The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus, systems and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks. The computer program instructions may also be loaded onto a computer or other programmable data processing apparatus to cause a series of operational steps to be performed in the computer or other programmable apparatus to produce a computer-implemented process, such that the instructions that execute in the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in a flowchart or block diagram may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of a block diagram and/or flowchart illustration, and combinations of blocks in block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts and equivalents of any means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    parsing, via a parser, an architecture description file to generate a module object, wherein the architecture description file corresponds to an architecture of a software application, wherein the architecture description file provides a platform-irrelevant high-level description of the software application, and wherein the module object corresponds in a one-to-one basis to a specific software module in the software application;
    parsing a stack data file to generate a call object, where the stack data file corresponds to a call stack of the software application, and wherein the call object is a function that is called by the software application during execution of the software application;
    comparing an invocation interface of the module object to the call object;
    in response to a match between the invocation interface of the module object and the call object, filling attributes of the module object into the call object, wherein the match is an exact match of characters in character strings from the invocation interface with characters in character strings from a plain text file that describes the call object, and wherein the attributes comprise a name of the module object, an identifier of the invocation interface of the module object, and an identifier of another module object that calls the module object.

2. The method of claim 1, where the step of parsing, via the parser, the architecture description file to generate the module object, is in response to a request to fill attribution information into the call object.

3. The method of claim 2, where the step of filling attributes of the module object into the call object further comprises: writing the attributes of the module object into an address in a memory and linking the call object to the address.

4. The method of claim 1, where the architecture description file comprises a list of software modules of the software application and an interface for each software module in the list of software modules.

5. The method of claim 4, further comprising graphically displaying a calling relationship between the software modules.

6. An apparatus, comprising:
    a first hardware circuit configured as a parser to parse an architecture description file to generate a module object, where the architecture description file corresponds to an architecture of a software application, wherein the architecture description file provides a platform-irrelevant high-level description of the software application, and wherein the module object corresponds in a one-to-one basis to a specific software module in the software application;
    a second hardware circuit configured as a comparison module to compare an invocation interface of the module object to a call object derived from a stack data file corresponding to a call stack of the software application, wherein the call object is a function that is called by the software application during execution of the software application; and
    a third hardware circuit configured as an association module to fill attributes of the module object into the call object in response to a match between the invocation interface of the module object and the call object, wherein the match is an exact match of characters in character strings from the invocation interface with characters in character strings from a plain text file that describes the call object, and wherein the attributes comprise a name of the module object, an identifier of the invocation interface of the module object, and an identifier of another module object that calls the module object.

7. The apparatus of claim 6, wherein the parser parses the architecture description file in response to a request to fill attribution information into the call object.

8. The apparatus of claim 7, wherein the association module:
    writes the attributes of the module object into an address in a memory; and
    links the call object to the address in the memory.

9. The apparatus of claim 6, wherein the architecture description file comprises a list of software modules of the software application and an interface for each software module in the list of software modules.

10. The apparatus of claim 9, further comprising a processor configured as a visualization engine to graphically display a calling relationship between the software modules.

11. A computer program product comprising a computer readable storage medium having computer readable program code embodied therewith, the computer readable program code comprising:
    computer readable program code configured to parse an architecture description file to generate a module object, wherein the architecture description file corresponds to an architecture of a software application, wherein the architecture description file provides a platform-irrelevant high-level description of the software application, and wherein the module object corresponds in a one-to-one basis to a specific software module in the software application;
    computer readable program code configured to parse a stack data file to generate a call object, wherein the stack data file corresponds to a call stack of the software application, and wherein the call object is a function that is called by the software application during execution of the software application;
    computer readable program code configured to compare an invocation interface of the module object to the call object; and
    computer readable program code configured to fill attributes of the module object into the call object in response to a match between the invocation interface of the module object and the call object, wherein the match is an exact match of characters in character strings from the invocation interface with characters in character strings from a plain text file that describes the call object, and wherein the attributes comprise a name of the module object, an identifier of the invocation interface of the module object, and an identifier of another module object that calls the module object.

12. The computer program product of claim 11, wherein the computer readable program code configured to parse an architecture description file to generate a module object is executed in response to a request to fill attribution information into the call object.

13. The computer program product of claim 12, further comprising computer readable program code configured to write the attributes of the module object into an address in a memory and link the call object to the address.

14. The computer program product of claim 11, wherein the architecture description file comprises a list of software modules of the software application and an interface for each software module in the list of software modules.

15. The computer program product of claim 14, further comprising computer readable program code configured to graphically display a calling relationship between the software modules.

16. The method of claim 1, wherein a set of data within the module object comprises a name of another module that directly calls the module.

17. The method of claim 1, further comprising:
   generating a user interface that depicts a call stack, wherein the call stack comprises both call objects that are not included in the call stack of the software application and call objects that are included in the call stack of the software application;
   receiving a filtering input from a user, wherein the filtering input identifies a particular software architecture; and
   displaying only call objects, from the call stack, that have been called using the particular software architecture.

18. The method of claim 1, wherein the module object comprises a set of data that includes a name of a module in the software application and a name of an invocation interface of the module.

19. The method of claim 1, wherein the stack data file is a plain text file output from a profiling tool.

20. The method of claim 1, wherein said filling attributes of the module object into the call object is performed by assigning an attribute from the module object to the call object, wherein the module object has attributes A, the corresponding call object initially has attributes C and D, and said filling of a call object B realizes $B(C, D) \rightarrow B(C, D, A)$.

* * * * *